US005524857A

United States Patent [19]

Eisenberg et al.

[11] Patent Number: 5,524,857

[45] Date of Patent: Jun. 11, 1996

[54] MULTI USE FLAG HOLDER APPARATUS

[76] Inventors: Ahikam Eisenberg, 621 Flanders Dr., N. Woodmere, N.Y. 11581; Mishel Perets, 671 Crown St., Brooklyn, N.Y. 11213

[21] Appl. No.: 104,627

[22] Filed: Aug. 11, 1993

[51] Int. Cl.$^{6}$ .................................................... A01K 97/10

[52] U.S. Cl. ........................... 248/535; 248/538; 116/173

[58] Field of Search .................................... 248/534, 535, 248/538, 205.2, 205.3, 536, 539, 518, 529; 116/173

[56] References Cited

U.S. PATENT DOCUMENTS

| | | | |
|---|---|---|---|
| 503,338 | 8/1893 | Woods | 248/535 X |
| 881,772 | 4/1908 | Sorensen | 248/535 X |
| 1,053,055 | 2/1913 | Ward | 248/536 |
| 3,217,690 | 11/1965 | Mihalisin | 116/173 |
| 4,583,310 | 4/1986 | Seiler | 116/173 X |
| 4,593,877 | 6/1986 | van der Wyk | 248/538 X |
| 4,986,209 | 1/1991 | Spica | 116/173 X |
| 4,986,504 | 1/1991 | Gary | 248/205.3 |
| 5,068,996 | 12/1991 | Shank | 248/538 X |
| 5,156,110 | 10/1992 | Fuller | 248/535 X |
| 5,231,785 | 8/1993 | Roberts | 248/538 X |

FOREIGN PATENT DOCUMENTS

| | | | |
|---|---|---|---|
| 202193 | of 1939 | Norway | 248/538 |

*Primary Examiner*—Alvin C. Chin-Shue
*Assistant Examiner*—Korie H. Chan
*Attorney, Agent, or Firm*—Ostrolenk, Faber, Gerb & Soffen

[57] ABSTRACT

A flag holder has a flag pole and a separately provided base. A coupling piece at one end of the flag holder enables connection of the flag pole to the base at various angles relative to a platform portion of the base. The flag pole with a flag attached thereto can be held by hand—by holding onto the coupling piece—and/or connected via the base and thus secured to any surface such as, for example, a window of a house, and/or a trunk, hood or side window of a car.

7 Claims, 5 Drawing Sheets

MULTI USE FLAG HOLDER APPARATUS

FIELD OF THE INVENTION

The present invention relates, generally, to an apparatus having a vast variety of possibilities to hold a flag or a band without any need for additional products or elements.

Specifically, the present invention relates to any car, bicycle, window or surface especially designed to hold a flag or banner in any place or hook it to any surface. The apparatus of the present invention, without causing any damage or need for accessories, can be easily applied to a car, bicycle, door, window, or any other place one needs to hook up a flag.

It will be understood by those skilled in the art that while the present invention had been specifically designed for use in connection with holding a flag, the use of the present invention can have numerous diverse applications, as is readily apparent from the present invention.

DESCRIPTION OF THE PRIOR ART

Heretofore, the prior art has included various simple sticks and hooking devices for use of diverse items such as large variety of different flag holders, which have to be carried by hand or tied to the car with ropes, nails, and screws.

These flag holders which are generally known in the prior art, have inherent disadvantages, including they lack any device to connect them to various types of surfaces. Such flag holders merely secure the flag itself. Use of such methods, for example, does not render any solution to securing the flag to a surface or a wall and in most cases is mostly ineffective and can be used for a limited time only.

Lacking any means for securing the flag holder so that whenever it could be secured to any surface or wall, the need for such an apparatus is apparent. As will be explained in greater detail below, the present invention overcomes the inherent disadvantages of the prior art.

SUMMARY OF THE INVENTION

It is an object of the present invention to provide a unique apparatus to secure a flag on various surfaces.

It is a further object of the present invention to provide various means to hold a flag or banner and to produce easy display mechanisms.

It is a further object of the present invention to provide an efficient and economical solution to the problem of keeping the flag or banner connected to a moving car or object.

An additional object of the present invention is to provide a simple, safe and comfortable device to hold and carry a flag or banner by hand.

In order to enable the easy handling of the multi purpose flag holder apparatus, a plastic pole is secured on a specially designed base, that allows a variety of angles and enables securement of the pole in any desired position. The specially designed joining base has a flexible U shape hook, situated under the pole base, and allows connecting the multi use flag holder to any surface, car, or other object.

The elements as utilized in the present invention, constitutes technology generally known to persons skilled in arts and are presently commercially available from a wide variety of sources.

The multi use flag holder apparatus that is very simple and safe for use, can be used also by users with no technical experience. This simplifies use of the multi purpose flag holder, because the design makes it easy to handle and use.

The specially designed base with the U shaped part, makes it easy to snap connect the base onto car side windows, trunk, hood, and also any flat surface, and also on flat surfaces at home, e.g. doors, walls, and windows.

The invention includes a flag holder that can be separated into two parts: one is the specially designed base, and the other is the pole. By this, the pole with the flag or the banner on it, can be held by hand at the base of the pole, that is designed especially to fit comfortably in one's palm.

The separation of the pole from the specially designed base of the multi use flag holder, can be done by releasing a pin that can be snapped in and out easily, and by sliding out the pole from the specially designed base.

To rejoin the pole and the specially designed base, the pole is slid onto the specially designed base, and the snap-in pin is used to secure the pole from sliding out by itself.

Other objects and features of the present invention will become more apparent from the accompany drawings and more detailed descriptions.

The drawings illustrate the preferred embodiments of the present invention. It should, however, be understood that the accompanying drawings/figures are merely illustrative and not intended to limit the scope of the present invention.

DETAILED DESCRIPTION

Figure 2A:
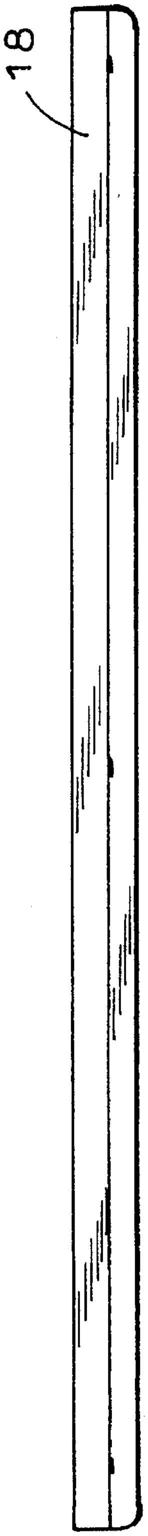
FIG. 2A illustrates the flag's pole.
Figure 2B:
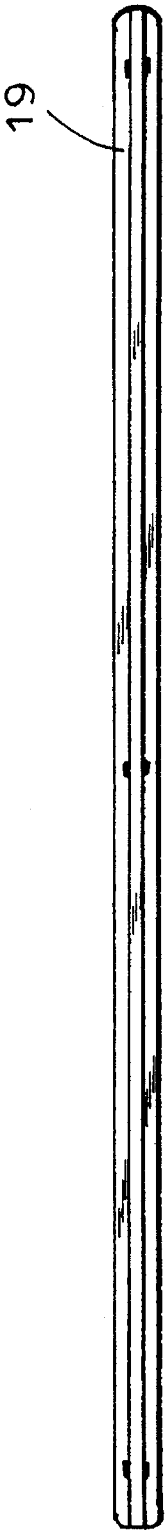
FIG. 2B illustrates a locking piece used to secure a flag to the pole of FIG. 2A.
Figure 3A:
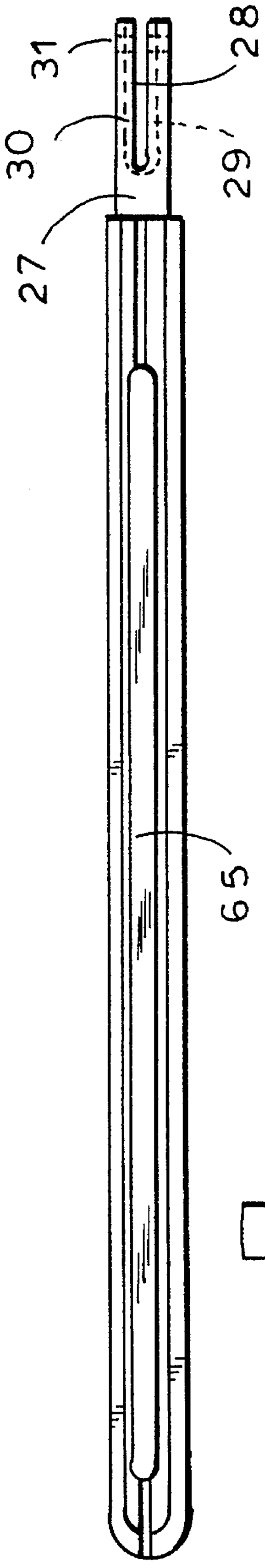
FIG. 3A is another view of the flag pole.
Figure 3B:
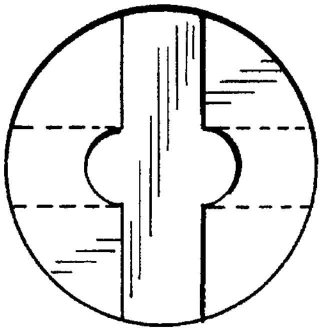
FIG. 3B is a first end view of the flag pole.
Figure 3C:
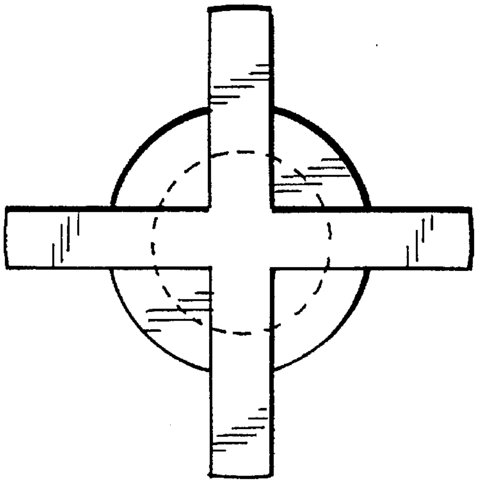
FIG. 3C is an end view of the other end of the flag pole.
Figure 4:
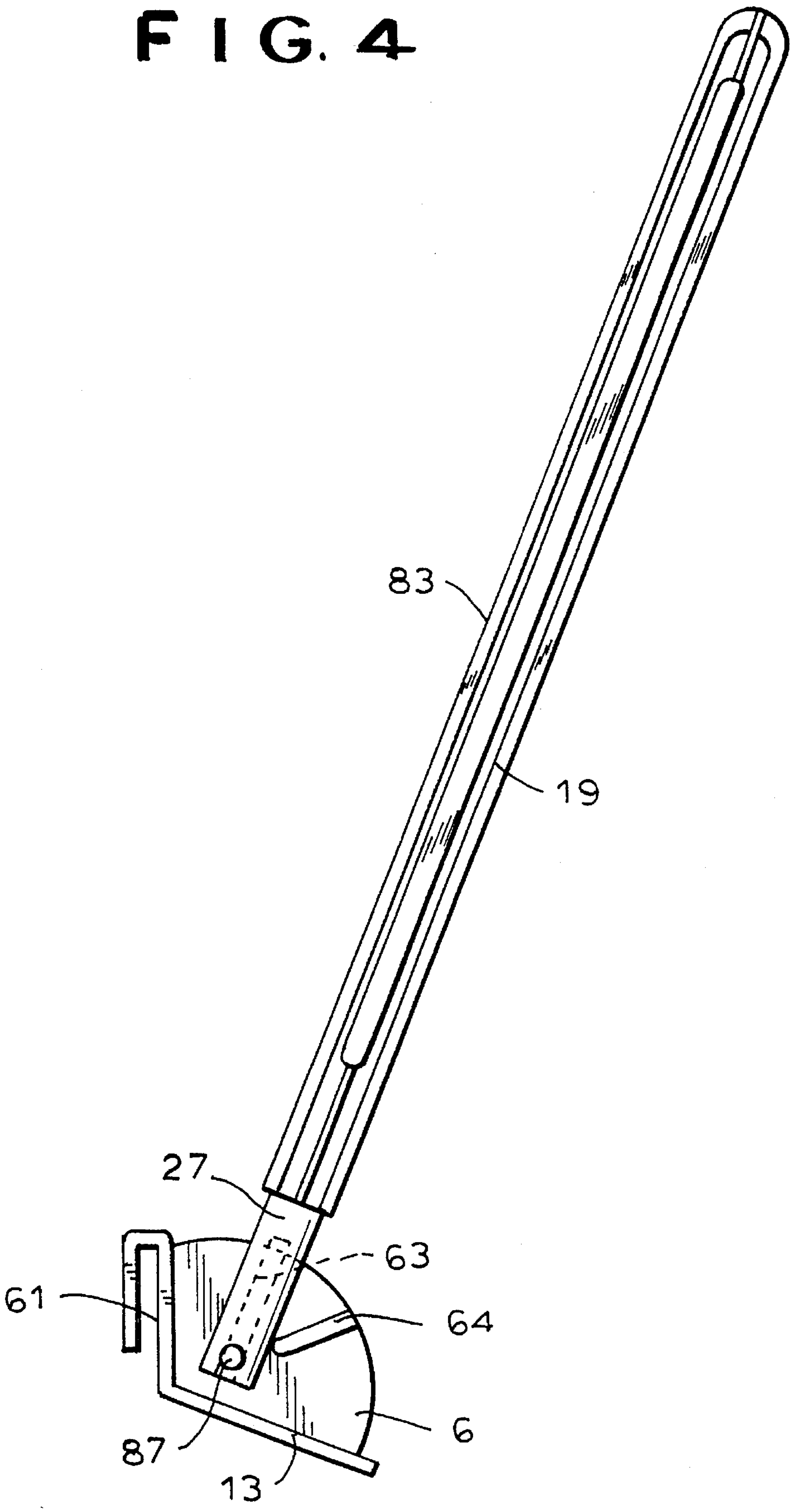
FIG. 4 shows the flag pole located into the base.
Figure 5A:
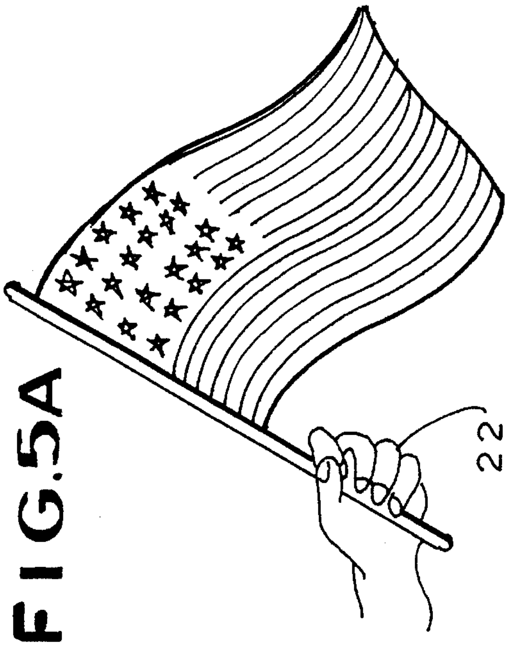
FIGS. 5A, 5B, 5C, 5D and 5E illustrate various modes of connection of the device of the present invention.
Figure 5C:
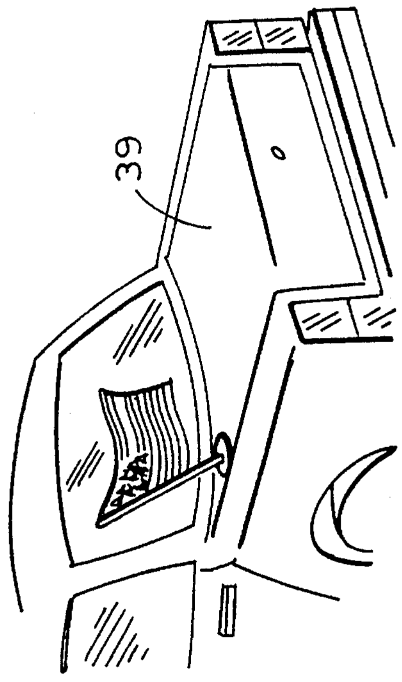
Figure 5B:
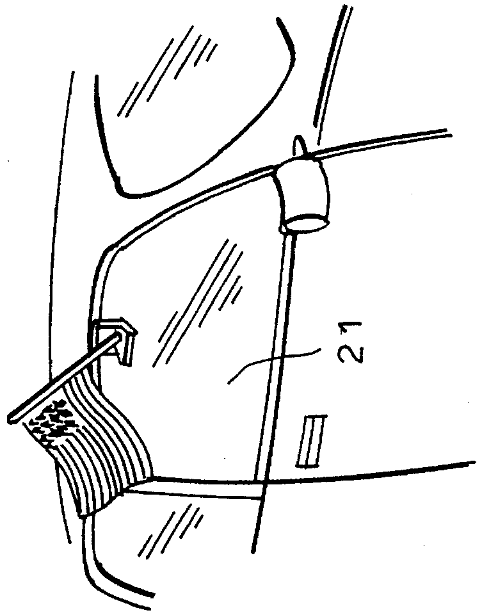
Figure 5D:
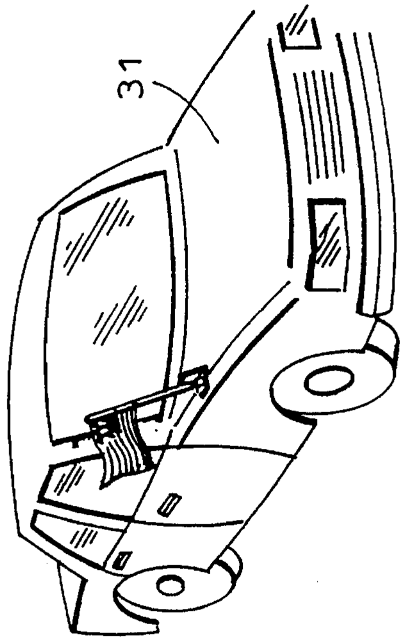
Figure 5E:
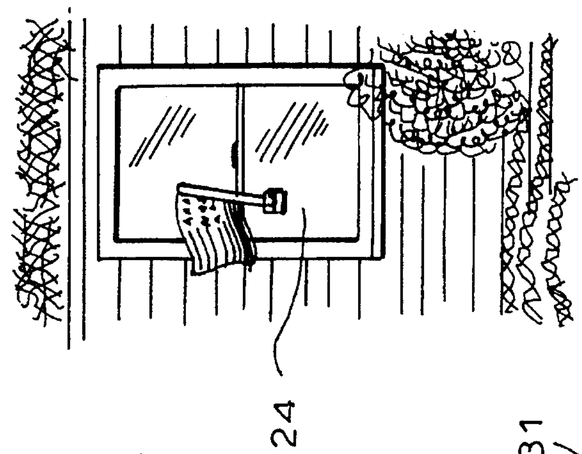

FIGS. 1A–1D show the specially designed base 4, including a platform 13, a flag pole holder 6 extending perpendicularly to the platform 13, and a snap-in pin 87. FIGS. 2A–2B show the pole 19 and the pole locking piece 18 used to secure a flag into the pole 19. FIGS. 3A–3C show a pole coupling piece 27, that is used to connect the pole 19 to the base 4. The coupling piece has a slot 28 defined by pieces 29 and 30 and holes 31 for the locking pin 87 shown in FIGS. 1A–1D. FIG. 4 shows the assembled flag holding apparatus 83. FIGS. 5A–5E illustrate some of the multi uses of the flag holder apparatus 83, for example, the holding thereof by hand 22, attachment to a car side window 21, or trunk 39 of a car, or front hood 31 of a car, or house window 24.

Figure 1D:
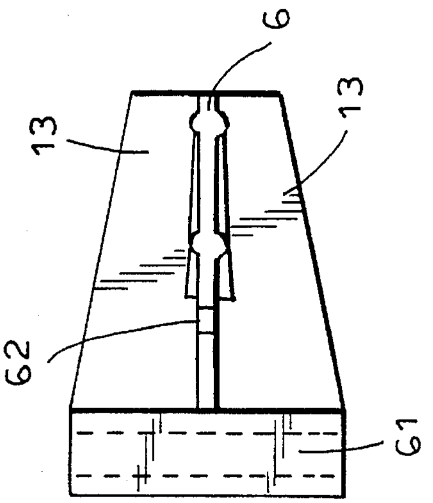
FIG. 1D is a front view of the element shown in FIG. 1A.
Figure 1C:
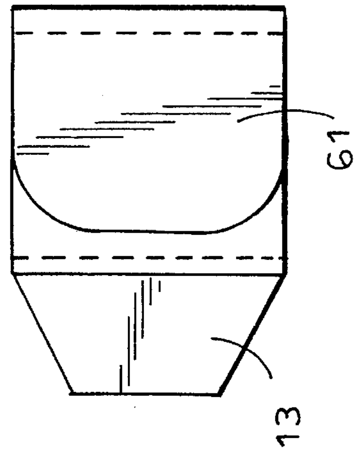
FIG. 1C is a rear view of the element shown in FIG. 1A.
Figure 1A:
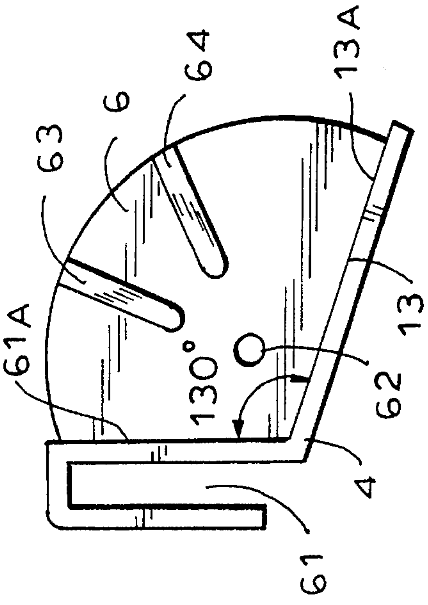
FIG. 1A is a side view of the flag holder base of the invention.
Figure 1B:
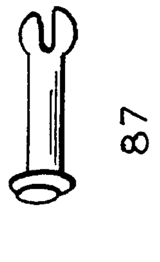
FIG. 1B depicts a pin for use with the base of FIG. 1A.

FIG. 1A is a view of the specially designed base with a U-shaped hooking part 61 that is designed to slide over and hold onto a car window, a car's trunk and/or a car's hood.

There is an angle of 130° between the platform 13 and the part 61. The pole holder 6 extends between the pieces 13 and 61. The platform 13 has a surface 13a and the part 61 has a surface 61a. These surfaces 13a and 61a are flat and define the aforementioned angle of 130°. The pole holder has a hole 62 for the locking pin 87 and pole registration ribs 63 and 64. A double sided extra strong self adhesive tape (not shown) can be attached to the underside of the platform 13. The pole coupling piece 27 can slide onto the pole holder 6, to either side of or in registration with the ribs 63 and 64, with the snap-in pin 87 passing through the holes 31 and 62 to secure the pole 19 to the pole holder 6.

The flag locking piece or insert 18 snaps into and locks a flag into the slot or ditch 65 (FIG. 3A) of the pole 19. The insert snaps into the pole because the insert is shaped to snap into the interior of ditch 65 in the pole 19.

FIGS. 5A–5E are illustrations of some of the multi uses of the flag holder apparatus which can be held by hand 22, when the pole with the flag are separated form the specially designed base, and carried by hand.

The flag holder apparatus can be secured to a side window 21 of a car, when the pole is secured in the specially designed base.

Alternatively, the flag holder apparatus can be secured to a back trunk 34 of a car, or to a front hood 31 of a car 31, or to a house window 24.

What is claimed is:

1. A flag holder, comprising:

a flag pole including flag holding mean for enabling attachment of a flag to the flag pole;

a separately provided base comprising a base platform and a hooking part, the base platform having a first surface and the hooking part having a second surface, the first surface and the second surface being disposed at an angle relative to one another and a pole holder extending perpendicularly to and connecting both the first surface and the second surface;

coupling means for detachably coupling and securing the flag pole to the pole holder in a manner which permits adjustment of an angle of inclination of the flag pole relative to the base platform.

2. The flag holder of claim 1 wherein the hooking part is connected to and is disposed at an angle to the platform, the hooking part being shaped to enable connection of the base to a support surface, such as a car window, hood, or trunk.

3. The flag holder of claim 2, wherein the hooking part is U-shaped.

4. The flag holder of claim 1, wherein the coupling means comprises a coupling piece disposed at an end of the flag pole and including spaced apart pieces which define a slot therebetween in which the pole holder is snugly fitted.

5. The flag holder of claim 4, further including a snap-in pin for holding together the coupling piece and the flag holder.

6. The flag holder of claim 1, wherein the coupling means comprises ribs on the pole holder for holding the pole at selected positions on the pole holder.

7. The flag holder of claim 1, wherein the pole comprises a ditch for receiving a portion of the flag therein and including a flag locking piece which can be snap fitted into the ditch.

* * * * *